United States Patent [19]

Kubik

[11] 4,043,125

[45] Aug. 23, 1977

[54] FLUID SYSTEM

[76] Inventor: Philip A. Kubik, 6809 Spruce Drive, Birmingham, Mich. 48010

[21] Appl. No.: 706,584

[22] Filed: July 19, 1976

[51] Int. Cl.² .............................................. F15B 20/00
[52] U.S. Cl. ........................................ 60/406; 60/493; 60/905
[58] Field of Search ................. 60/403, 406, 445, 464, 60/489, 493, 905

[56] References Cited

U.S. PATENT DOCUMENTS

| 3,685,290 | 8/1972 | Krusche | 60/905 X |
|---|---|---|---|
| 3,713,291 | 1/1973 | Kubik | 60/380 X |
| 3,744,375 | 7/1973 | Kubik | 92/110 X |
| 3,750,406 | 8/1973 | Verlinde | 60/443 X |

Primary Examiner—Edgar W. Geoghegan
Attorney, Agent, or Firm—Andrew R. Basile

[57] ABSTRACT

A fluid system having a variable displacement fluid pump connected in a closed-loop fashion to a hydraulic motor-driven winch of the spool type. A directional control valve connected between the pump and motor selectively directs fluid to the hydraulic motor-operated winch to control the direction of movement thereof. The hydraulic winch is provided with a pressure responsive brake that is normally set to brake the winch and prevent its operation, while fluid under pressure communicated to the brake will release the same and permit the winch to operate. A separate source of fluid pressure is provided and selectively communicated to the hydraulic brake of the winch through a directional control valve, while a second control valve is provided for exhausting the control pressure to the reservoir in the event the main system pressure drops below a predetermined value. In such situations the brake control pressure is vented and the brake operates instantly to prevent further movement of the hydraulic motor-operated winch.

5 Claims, 1 Drawing Figure

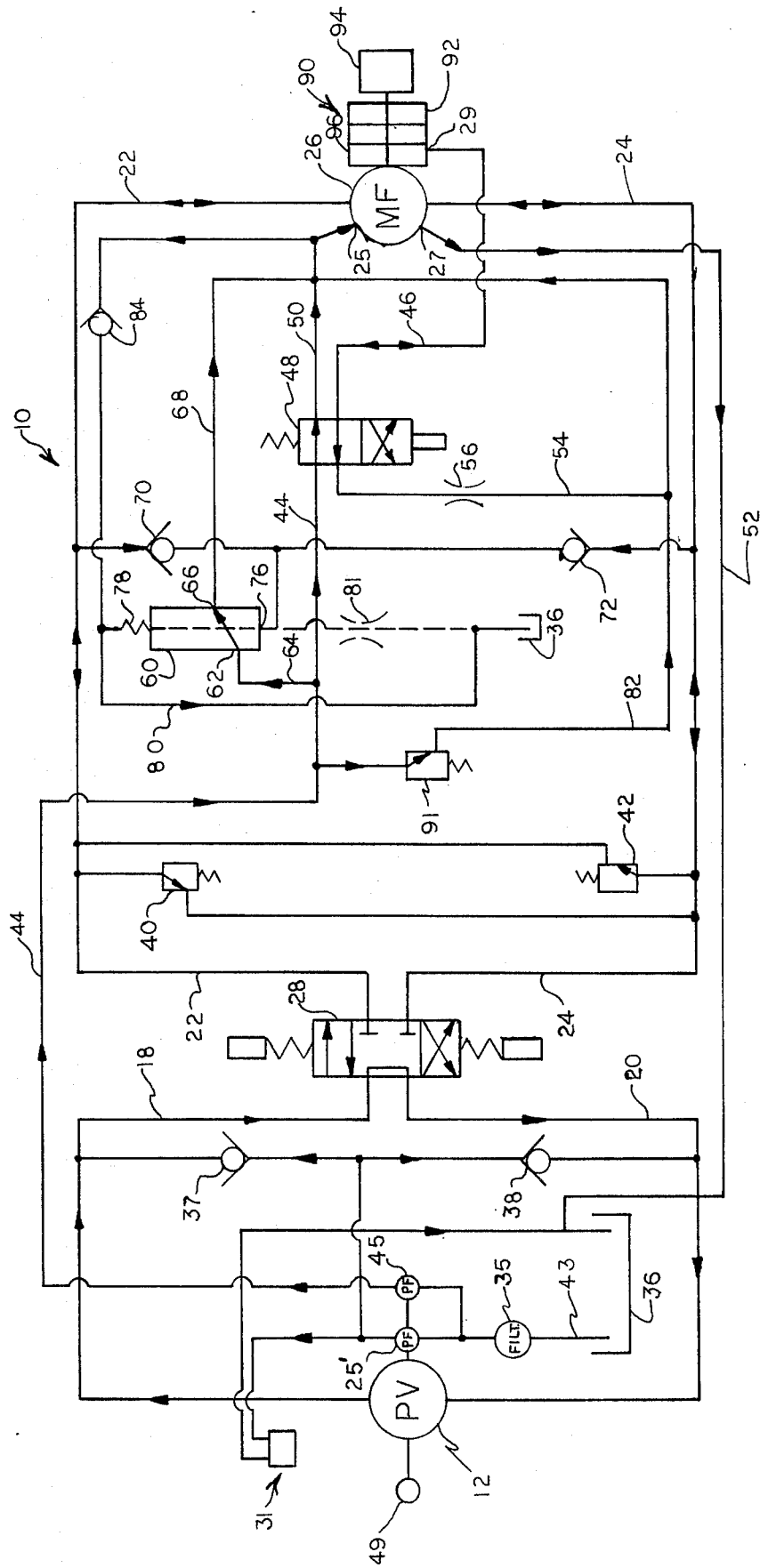

FLUID SYSTEM

BACKGROUND OF THE INVENTION

I. Field of the Invention

The present invention relates to fluid systems and, in particular, to a system for hydraulic motor-operated winches provided with a fail-safe circuitry for setting the winch brake in the event of a system failure.

II. Description of the Prior Art

Heretofore, various systems and apparatuses have been employed in the manufacture and marketing of hydraulic motor-actuated winches. A typical example of such winches is marketed by the Gearmatic Company of Surrey, Canada. Such winches are provided with a fail-safe feature wherein the loss of system pressure results in the setting of the brake to stop rotation of the winch. To the knowledge of the inventor, no such system has been devised for closedloop hydraulic systems which function in an acceptable manner to insure the setting of the hydraulic winch brake in the event of a system failure.

SUMMARY OF THE INVENTION

The present invention, which will be described subsequently in greater detail, comprises a fluid system employing a separate source of fluid pressure which is selectively directed to the braking mechanism of a hydraulic motor-actuated winch for the purposes of releasing the winch brake when it is desired to operate the winch. The winch is of the type in which the brake automatically sets in the event of a loss in brake pressure. The system further comprises valve means operable upon a reduction in system pressure to vent the separate source of pressure and thereby instantaneously sets the winch brake to prevent further movement of the winch.

It is therefore an object of the present invention to provide a new and improved means for insuring the safety and integrity of hydraulic motor-operated winch systems.

It is a further object of the present invention to provide a closed-loop fluid system which employs a separate brake control pressure and related valves for setting and releasing the brake of a hydraulic motor-operated winch.

It is yet a further object of the present invention to provide a system of the type disclosed herein which is simple in construction and design and, thus, easy to maintain and reliable in its performance and operation.

Other objects, advantages and applications of the present invention will become apparent to those skilled in the art of braking hydraulic motor-operated winches when the accompanying description of one example of the best mode contemplated for practicing the invention is read in conjunction with the accompanying drawing.

BRIEF DESCRIPTION OF THE DRAWING

The description herein makes reference to the accompanying drawing wherein the sole FIGURE represents a schematic illustration of one example of a fluid system constructed in accordance with the principles of the present invention.

DESCRIPTION OF THE PREFERRED EMBODIMENT

Referring now to the drawing, there is illustrated a fluid system 10 constructed in accordance with the principles of the present invention and comprising a variable displacement pump 12 having inlet and outlet ports, respectively, connected in a closed-loop fashion by conduits 18 and 20, 22 and 24 to the inlet and outlet ports of a hydraulic motor 26. The hydraulic motor 26 forms a portion of a self-contained hydraulic winch 90 which may be a piston-type hydraulic motor cartridge having speed reductions, such as planetary gears 92, to connect the output shaft of the hydraulic motor to the spool 94 of the winch 90. Generally such hydraulic motor-operated winches include a housing having a case which is immersed in fluid and functions in the conventional manner to provide lubrication to the various working components of the unit. The motor housing includes a case inlet port 25 and a drain port 27. Such motors are further provided with an internal, automatic brake 96 which is spring biased to set and lock the winch spool 94 and to prevent rotation when not in communication with pressure through a pressure port 29. Communication of pressure to the brake through pressure port 29 will function to release the brake and permit the winch spool 94 to operate in the conventional manner. The construction, design, and operating details of a hydraulic motor-operated winch are known to those skilled in the art, and reference may be had to the hydraulic winch manufactured by Gearmatic, as aforementioned.

Incorporated in the fluid system 10 is a conventional four-way solenoid operated, spring centered, directional control valve 28 which is adapted to connect conduits 18 and 20, selectively, to the conduits 22 and 24 or to be positioned tandem-center to allow communication between the conduits 18 and 20 but to prevent communication between the conduits 22 and 24.

The pump 12 may be any suitable variable displacement pump, such as the pump disclosed in U.S. Pat. No. 3,713,291 or U.S. Pat. No. 3,744,375. Suitable control elements and control circuitry 31, as disclosed in the aforementioned patents, are utilized to control the displacement of the pump 12 and, thus, the amount of fluid displaced by the pump 12 and delivered to the motor 26. A fixed displacement supply pump 25' provides fluid under constant pressure to the control elements 31 of the variable displacement pump 12, which, in turn, draws fluid from a reservoir 36. The control mechanism and the manner in which it functions are described in greater detail in the aforementioned Letters Patents; and since the same does not form the subject matter of the present invention, a further detailed description is not necessary.

The fluid pump 12 communicates with the fluid reservoir 36 through filter 35, the supply pump 25', valve checks 37 and 38 on the pump inlet, and a drain conduit (not shown), all of which is described in greater detail in the aforementioned Letters Patents.

A prime mover, such as an electric motor schematically illustrated at 49, is mechanically connected through a suitable coupling to the drive shaft of the fluid pump 12 which, in turn, drives the supply pump 25' and a brake pressure supply pump 45. The supply pump 25', which may be a gear pump, is designed to deliver fluid at a constant pressure to the control element 31 of pump 12 and is in communication with the reservoir 36 through supply conduit 43 and filter 35 for supplying and replenishing the fluid in the main system conduits 18 and 20 by means of check valves 37 and 38.

Downstream from the directional control valve 28, the conduits 22 and 24 are respectively connected to the inlets of high-pressure relief valves 40 and 42 which, at a predetermined pressure, i.e. 3000 p.s.i., will exhaust the fluid pressure from one of the conduits to the other conduit to prevent damage to the system in the event of over pressurization.

The brake pressure supply pump 45, which in a manner similar to the supply pump 25' may be any suitable pump, such as a gear pump, is in communication with the reservoir 36 through a supply conduit 43 and the filter 35 for supplying fluid under pressure to the brake release port 29 via conduits 44 and 46. Intermediate the brake supply conduits 44 and 46, there is provided a directional control valve 48 which selectively functions to connect the brake pressure supply conduit 44 to the conduit 46, such that fluid under pressure is communicated directly from the fixed displacement supply pump 25' to the brake pressure port 29 whereupon the brake 96 within the hydraulic winch 90 is released and the winch 90 is free to rotate. The directional control valve 48 is operable to the position illustrated to connect the supply conduit 44 to an exhaust conduit 50 which, as can be seen in the drawing, communicates directly with the case inlet port 25, which is drained through the drain port 27 back to the reservoir 36 via return conduit 52. At the same time the brake pressure supply conduit 46 is communicated to a return conduit 54 which, in turn, communicates with the exhaust conduit 50 whereby the fluid within the brake 96 is exhausted back to the reservoir 36, and the brake 96 is set. A suitable restriction 56 is provided within the return conduit 54 to control the rate at which the brake 96 is set. It can thus be seen that the brake 96 may be selectively released and set merely by activating the solenoid operated, directional control valve 48. The same is operated generally in some time relation to the shifting of the directional control valve 28 such that when high-pressure fluid is directed to the conduit 22 so as to cause the motor 26 to rotate in one direction, pressure is simultaneously communicated from the brake pressure supply pump 45 via conduits 44 and 46 to the brake release port 29 to release the brake 96 and to permit the winch 90 to operate. Conversely, if fluid is communicated via the conduit 24 from the pump 12 to the motor 26 to cause rotation in an opposite direction, simultaneously therewith the solenoid operated, directional control valve 48 is so shifted so as to communicate the conduit 44 to the conduit 46 and thereby pressurize the brake 96 to release the same and to permit the winch 90 to rotate. When the directional control valve 28 is operated so as to prevent fluid communication of the output of pump 12 with either of the conduits 22 or 24 and to terminate movement of the motor 26, simultaneously therewith the direction valve 48 is actuated to shift to the illustrated position communicating the brake pressure supply conduit 44 to the exhaust conduit 50 thereby dumping the pressure fluid to reservoir 36, while at the same time conduit 46 is communicated to return conduit 54 thereby dumping the pressure within the brake, causing the brake to set and thereby preventing rotation of the winch 90.

In order to protect the integrity of the system 10, a brake pressure control valve 60 is provided to insure that pressure is not directed to the brake to release the same during a system failure, such as (a) if the main system pressure falls below some predetermined value, such as 100 p.s.i.; (b) in the event the charge pressure falls below some predetermined value, say 100 p.s.i.; (c) in the event the solenoid operated valve 48 fails; and (d) in the event the solenoids which operate the main directional control valve 28 should fail.

The valve 60 has an inlet port 62, which constantly communicates via inlet conduit 64 with the brake pressure supply conduit 44 and, thus, brake pressure from the pump 45, is always communicated to the valve 60. The outlet port 66 of the brake pressure control valve 60 communicates via a conduit 68 with the exhaust conduit 50 such that the outlet port 66 of the brake pressure control valve 60 is in constant fluid communication with the reservoir 36 via the case of the fluid motor 26.

Spring biased check valves 70 and 72 respectively communicate pressure from the conduits 22 and 24 to a sensing port 76 of the brake pressure control valve 60. The check valves 70 and 72 function in a conventional manner and permit the pressure from whichever of the conduits 22 or 24 is higher to be communicated with the pressure sensing port 76. The valve 60 is so designed as to have a conventional-type spool which is movable in response to the pressure at the sensing port 76 to close communication between the inlet and outlet ports 62 and 66 respectively. A spring 78 functions to normally bias the spool element of the valve 60 to the open position wherein a predetermined loss of pressure occurs at the sensing port 76. This results in the supply pressure from the conduit 44 being communicated via valve 60 directly to the reservoir 36 via the conduits 64, 68, 50, the motor case, and conduit 52. Suitable passageways extending through the bore of the spool element of the valve 60 communicate the pressure to a return conduit 80, which is connected with the reservoir 36. A restriction 81 communicates the port 76 with reservoir 36 to permit a decay of the sensed pressure at a controlled rate.

It can thus be seen that, if system pressure in either of the main conduits 22 or 24 drops below some predetermined value, i.e. 100 p.s.i., the spring 78 in the valve 60 will move the spool element therein to the position communicating the conduits 44 with the reservoir 36. This takes place irrespective of the position of the directional control valve 48. For example, if the valve 48 is shifted so as to communicate fluid pressure from the conduit 44 to the conduit 46 and thus to release the brake of the winch 90, the pressure therein would be automatically dumped back to reservoir 36 through the valve 60 if the main system pressure dropped below a predetermined value. If the control valve 48 was in the position communicating the brake release mechanism to the reservoir 36, the brake would have already been set irrespective of the operation of the valve 60. It can be seen that irrespective of the type of system failure, whether it be due to pump failure, motor failure, charge pump failure, or solenoid failure, the resulting pressure drop in the main system conduits 22 and 24 will result in the brake release port 29 being communicated via valve 60 with the reservoir 36 and thus automatically setting the brake of the winch 90.

A pressure relief valve 91 is in communication with the conduit 44 to control the maximum pressure of the brake supply circuit; and when the same exceeds a predetermined value, it is dumped back to reservoir via a conduit 82 which, in turn, is connected to the exhaust conduit 50. A check valve 84 is disposed within the return line 80 and functions as a case relief valve to limit the pressure of the fluid in the case.

It can thus be seen that the present invention provides a new and improved means for insuring the proper operation of the brake release mechanism of a motor-operated winch operating in a closed-loop hydraulic system with external brake operation; the same operating in a fail-safe manner to insure the safety of the users of the winch.

While only one form of the present invention has been disclosed, it should be understood by those skilled in the art of fluid systems for hydraulic motor-actuated winches that other forms of applicant's invention may be adopted, all coming within the spirit of the invention or scope of the appended claims.

What is claimed is as follows:

1. A fluid system comprising:
    a fluid pump having an outlet;
    a fluid motor having an inlet;
    a winch driven by said fluid motor;
    conduit means fluidly connecting said pump outlet with said motor inlet, said winch having a pressure responsive brake normally set to brake said winch and prevent the same from operating, said brake being operable upon communication with a source of pressure to release said brake and permit said winch to operate;
    a source of fluid pressure separate from said fluid pump;
    a source of low-pressure fluid;
    first valve means operable upon actuation to selectively connect said brake to either said source of fluid pressure or to said source of low-pressure fluid for selectively setting and releasing said brake; and
    second valve means operable in response to a predetermined drop in the pressure of the fluid in said conduit means for connecting said source of fluid pressure to said source of low pressure whereby said brake is set irrespective of the position of said first valve means.

2. The fluid system defined in claim 1 wherein said fluid pump has an inlet and said fluid motor has an outlet;
    second conduit means connecting said fluid motor outlet to said pump inlet such that said pump and motor are connected in a closed-loop circuit; and
    means for connecting said second valve means to whichever of said conduits has high-pressure fluid therein, said second valve means being operable in response to a predetermined drop in the pressure in said last-mentioned conduits.

3. The fluid system defined in claim 2 wherein said source of low-pressure fluid is a reservoir.

4. The fluid system defined in claim 2 further comprising a second fluid pump, said second fluid pump comprising said source of fluid pressure and conduit means connecting said second fluid pump to said first and second valve means.

5. The fluid system defined in claim 4 wherein said first-mentioned fluid pump is of the variable displacement type;
    control means for varying displacement of said variable displacement pump; and
    a third fluid pump for supplying controlled pressure to said control means to operate the same.

* * * * *